United States Patent Office 3,301,657
Patented Jan. 31, 1967

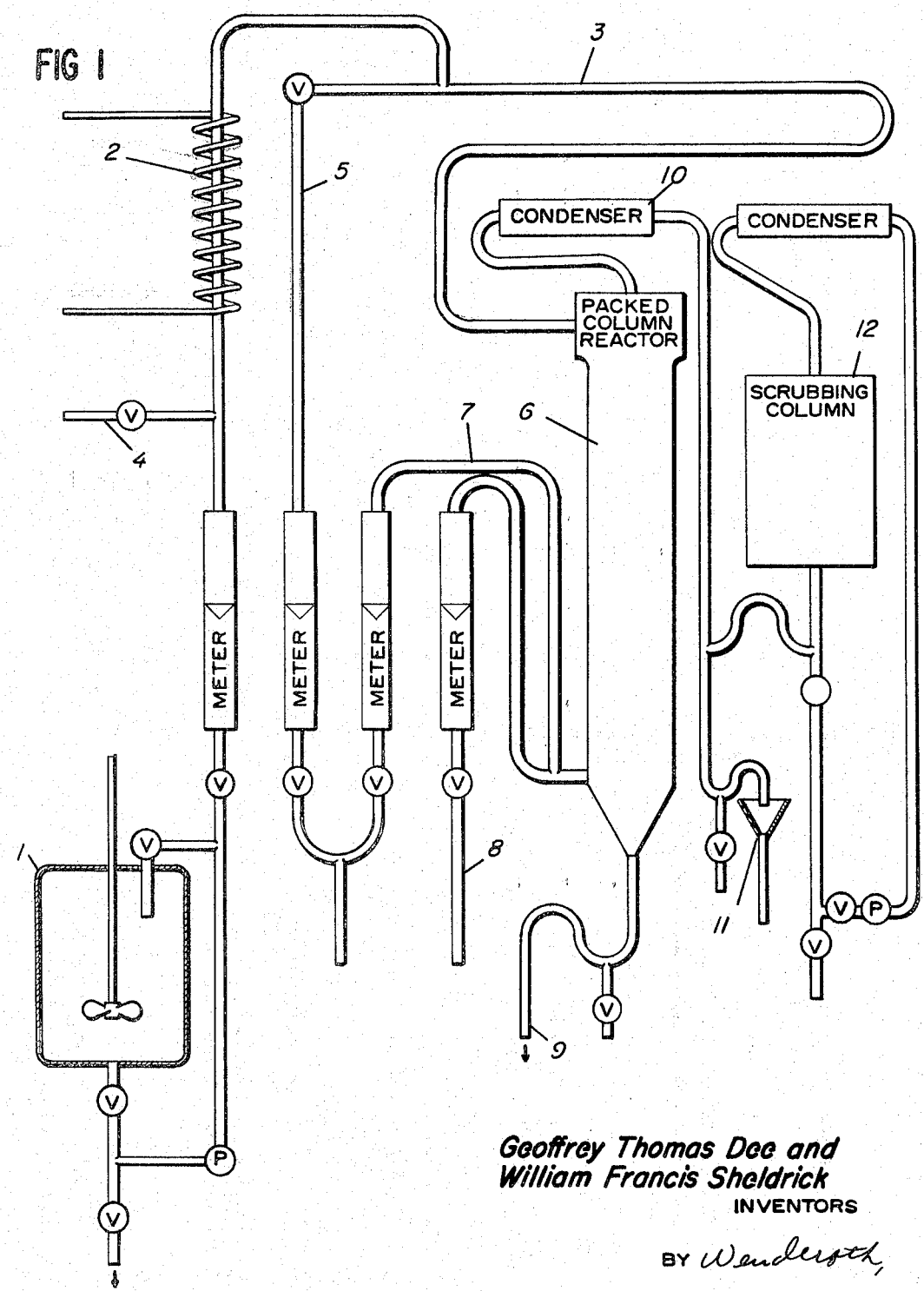

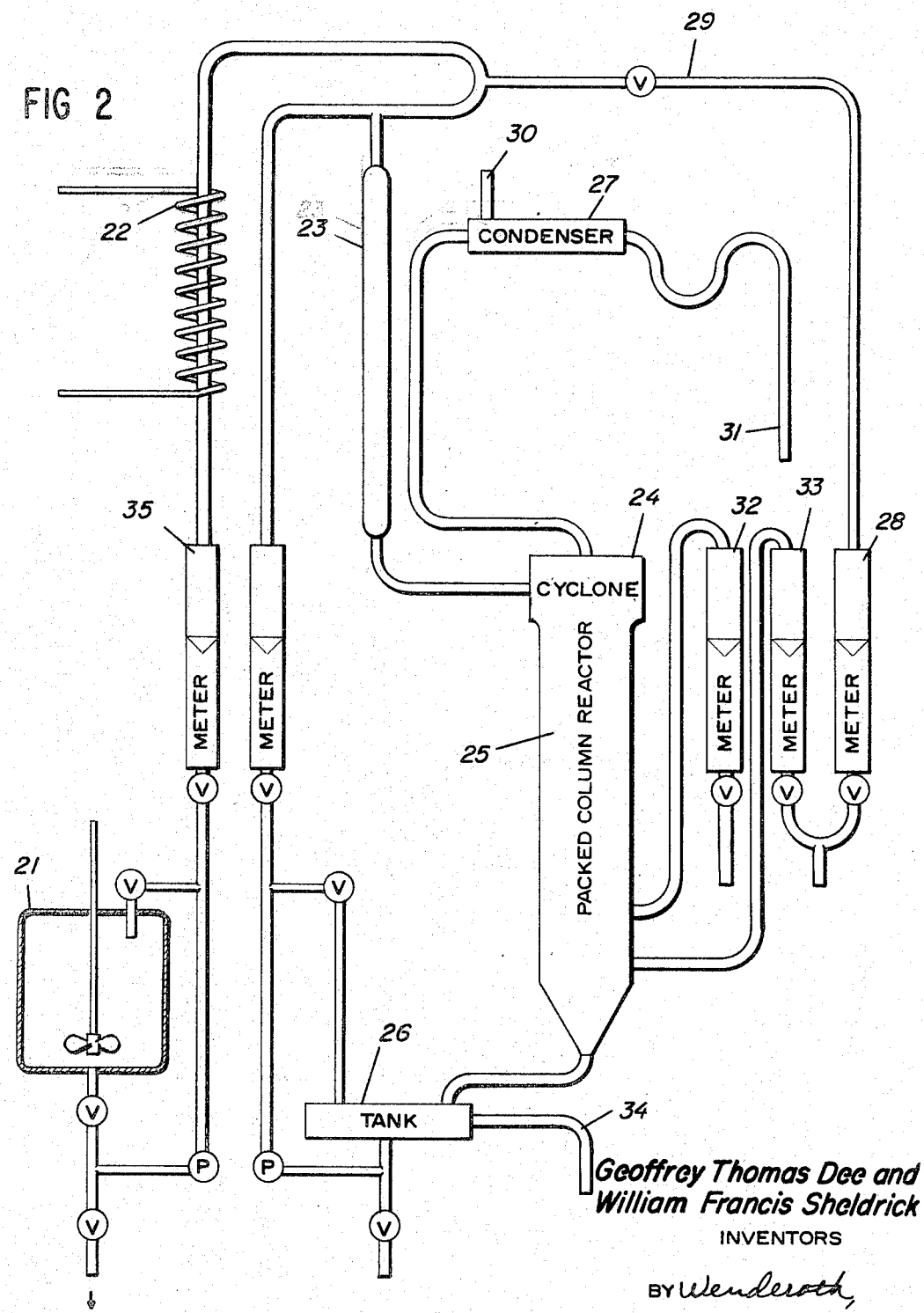

3,301,657
FERTILIZER PROCESS COMPRISING TWO-STAGE AMMONIATION WITH COUNTER CURRENT GAS TREATMENT
Geoffrey Thomas Dee, Kesgrave, near Ipswich, Suffolk, and William Francis Sheldrick, Nacton, near Ipswich, Suffolk, England, assignors to Fisons Fertilizers Limited, Felixstowe, England
Filed Oct. 22, 1965, Ser. No. 508,636
Claims priority, application Great Britain, Mar. 15, 1962, 9,919/62
10 Claims. (Cl. 71—43)

The present application is a continuation-in-part of copending application Serial No. 264,249 filed on March 11, 1963, now abandoned, and relates to the preparation of ammonium salts and fertilizers based thereon.

It is known that ammonium salts may be made by ammoniation of the corresponding acids.

In the manufacture of ammonium salts by the treatment of acids with ammonia, heat is evolved which is desirably used to remove the water present in the ammoniation system. However, at the high temperatures and high concentrations which result, the stability of the ammonium salt at the relatively high pH levels which are desirable is adversely affected and loss of nitrogen as ammonia, nitric acid, nitrogen oxides or ammonium salts occurs. It has now been found that these difficulties can be avoided by performing the ammoniation of the acid or acids in two stages under controlled pH conditions.

Accordingly the present invention provides a process for the manufacture of ammonium salts containing less than 5% by weight of water which comprises, in a first stage, forming a mixture of ammonium salt and acid, said mixture being selected from the group consisting of (a) a mixture of nitric acid and its ammonium salt having a pH in the range 3.5 to 4.5, (b) a mixture of sulphuric acid and nitric acid and their ammonium salts having a pH in the range 2.0 to 3.0, (c) a mixture of phosphoric acid and its ammonium salt having a pH in the range 2.0 to 3.0, and (d) a mixture containing at least two compounds selected from the group consisting of nitric acid, phosphoric acid, ammonium nitrate and ammonium phosphate, the selection being made so as to provide at least one acid component, at least one compound containing the nitrate radical, i.e., nitric acid and ammonium nitrate, at least one compound containing the phosphate radical, i.e., phosphoric acid and ammonium phosphate, and at least one ammonium containing component, said admixture (d) having a pH in the range of 2.0 to 3.0. Included with the admixture (d) are mixtures such as (a) phosphoric acid, nitric acid and ammonium nitrate, (b) phosphoric acid and ammonium nitrate, (c) phosphoric acid, ammonium phosphate and nitric acid, (d) phosphoric acid, ammonium phosphate and ammonium nitrate, (e) phosphoric acid, ammonium phosphate, ammonium nitrate and nitric acid.

The product thus formed from the first stage is treated at an elevated temperature in the range 120 to 200° C. with a countercurrent stream of ammonia gas whereby its water content is reduced and an ammonium salt containing less than 5% by weight of water is obtained, said salt being selected from the group consisting of ammonium nitrate, ammonium sulphate nitrate, mono-ammonium phosphate, diammonium phosphate and mixtures of ammonium phosphate and ammonium nitrate.

Throughout this specification the pH referred to is that of a solution obtained by mixing 1 part of the material the pH of which is being measured with 9 parts by weight of water.

The process of the present invention is of general application in the manufacture of ammonium salts but is particularly useful in the ammoniation of nitric acid or mixtures containing nitric acid or in the ammoniation of phosphoric acid or mixtures containing phosphoric acid. For example the process may be used in the manufacture of ammonium nitrate from nitric acid in which case the pH of the product from the first stage is preferably in the region 3.5 to 4.5. The process may also be used in the manufacture of ammonium sulphate nitrate in which case the pH of the product from the first stage is preferably in the region 2.0 to 3.0. Additionally the process may be used in the manufacture of monoammonium phosphate or diammonium phosphate in which case the pH of the product from the first stage is preferably in the region 2.0 to 3.0. The process of the present invention is of significant utility in the manufacture of mixtures of ammonium nitrate and ammonium phosphate by the ammoniation of solutions comprising phosphoric acid and nitric acid and/or ammonium nitrate.

In the ammoniation of solutions comprising phosphoric acid and nitric acid and/or ammonium nitrate the pH of the product from the first stage is suitably in the range 2.0 to 2.8, preferably in the range 2.3 to 2.8. In this ammoniation sulphuric acid may be included with the phosphoric acid and nitrate up to a maximum amount of 20% by weight based on the weight of the fully ammoniated solution. Wet process phosphoric acid usually contains some sulphuric acid.

By using countercurrent ammoniation of a mixture of ammonium salt and acid at a pH of 2.0 to 3.0 or in the case of ammonium nitrate and nitric acid at a pH of 3.5 to 4.5, at an elevated temperature it is ensured that water is disengaged at a pH of 2.0 to 3.0 at which pH it has been found that loss of nitrogen while removing water is a minimum. If water is disengaged at a higher pH than 3.0 there is a significant removal of ammonia while at a pH lower than 2.0 there is a loss of nitrogen oxides. Quite surprisingly it has also been found that if an inert gas such as air is passed through the mixture cocurrent with the ammonia gas almost anhydrous ammonium salts can be obtained and, for example, in the case of mixtures of ammonium nitrate and ammonium phosphate fluid mixtures can be obtained having water contents below 5% by weight, for example having water contents in the range of 0.1% to 2% or more particularly in the range of 0.1% to 0.5% by weight. This finding is very significant in the case of mixtures containing ammonium nitrate and ammonium phosphate which cannot be prepared having low water contents and certain $N:P_2O_5$ ratios by direct ammoniation of acid material because of the formation of viscous slurries which cannot be processed. It is thought that when the water content is reduced to the low levels here contemplated, that part of the orthophosphates is converted into non-orthophosphates such as pyrophosphates.

In the second stage of the process heat is evolved in the reaction of the ammonia with acid and it is a feature of the present invention that this heat is used to assist in the removal of water from the mixture being ammoniated. By this means it is possible to avoid a separate water removal stage and thereby realise an economic method of forming ammonium salts of low water content.

The countercurrent ammoniation is preferably carried out in a packed tower reactor the product from the first stage being fed countercurrent to the stream of ammonia in the tower. The temperature of the material being ammoniated is preferably in the range 140° C. to 190° C. when mixtures of ammonium nitrate and ammonium phosphate are being formed. This temperature may be attained by the heat evolved in the reaction and/or by feeding material at an elevated temperature to the reaction.

The mixture of ammonium salt and acid may be formed in a number of ways. For instance the mixture of ammonium salt and acid may be formed by treating the acid with ammonia gas until the required pH is reached, i.e. until a pH of 2.0 to 3.0 is reached or, when making ammonium nitrate, until a pH of 3.5 to 4.5 is reached. The treatment of acid with ammonia gas may be performed in a tubular reactor in which case the ammonia gas is preferably fed cocurrently with the acid through the reactor thereby ensuring that any water which may be disengaged as a result of the reaction will be disengaged at the optimum pH for this purpose, namely a pH of 2.0 to 3.0.

Preferably the first stage formation of the mixture of ammonium salt and acid is carried out by the treatment of the acid with ammonia in a stirred tank reactor. In this method the reactants are fed to a tank containing previously reacted material at an elevated temperature and a low moisture content, the elevated temperature being obtained by the heat of reaction between the acid and ammonia and possibly by heat supplied from an outside source or by the use of preheated reactants. Suitably the reaction in the stirred tank reactor is carried out at within 0° to 5° C. of the boiling point of the reaction mixture. Preferably the reaction is carried out at a temperature at which water boils off from the reaction mixture. By adjusting the concentration and temperature of the materials fed to the stirred tank reactor the contents of the tank can be maintained at the desired temperature and water content. In the manufacture of mixtures of ammonium nitrate and ammonium phosphate the water content of the mixture in the tank is preferably maintained in the range 2 to 10% by weight and of the materials fed to the tank any nitric acid preferably contains 40% to 80% by weight $HNO_3$, any phosphoric acid contains 30% to 60% by weight $P_2O_5$, any ammonium nitrate solution is at an elevated temperature and contains 85% to 100% ammonium nitrate and any ammonium phosphate feed may range from a 40% solution to a solid feed.

The mixture of ammonium salt and acid may also be formed by a process which comprises adding phosphoric acid and/or nitric acid to part of the product from the second stage. Further ammonia may also be added at this stage if desired in this method of formation of the mixture of ammonium salt and acid.

In a preferred embodiment of the present invention the first stage formation of the mixture of ammonium salt and acid at a pH of 2.0 to 2.8 is carried out by treating acid with ammonia in a stirred tank reactor and in the second stage the product from the first stage at an elevated temperature is treated with a countercurrent stream of ammonia, preferably of ammonia together with an inert gas. Accordingly the present invention provides a process for the manufacture of a mixture of ammonium nitrate and ammonium phosphate containing less than 5% by weight of water which comprises, in a first stage, treating a mixture containing at least two compounds selected from the group consisting of nitric acid, phosphoric acid, ammonium nitrate and ammonium phosphate, the selection being made so as to provide at least one acid component, at least one nitrate containing component and at least one phosphate containing component, with ammonia gas until a pH in the range 2.0 to 2.8 is attained and, in a second stage, treating the product from the first stage at an elevated temperature with a countercurrent stream of ammonia or preferably of ammonia together with an inert gas, whereby its water content is reduced and a mixture of ammonium nitrate and ammonium phosphate is obtained containing less than 5% by weight of water. Preferably in the first stage the reaction between ammonia gas and the two compounds selected from the group consisting of nitric acid, phosphoric acid, ammonium nitrate and ammonium phosphate, is carried out in the presence of a medium containing ammonium ions, hydrogen ions, nitrate ions, phosphate ions and 3% to 8% by weight of water, said medium being held at its boiling point and having a pH in the range 2.0 to 2.8. In effect the medium comprises reaction product obtained in the first stage.

When mixtures containing ammonium nitrate and ammonium phosphate are being formed by the process according to the present invention the ammonium phosphate may comprise monoammonium phosphate or diammonium phosphate or an ammonium phosphate having an intermediate ammonium content. Preferably the ammonium phosphates have an average $NH_3:H_3PO_4$ ratio in the range 0.9:1 to 1.7:1.

The ammonium salts, particularly the melts of ammonium nitrate and ammonium phosphate obtained by the process of the present invention, may be formed into fertilizers either by prilling or granulating or converting into flakes or powders. Other fertilizer materials such as potassium salts, superphosphates, urea, trace elements and the like, may be added to the melt before or during the processing of the melt into prills, granules, flakes or powders. Alternatively blends of the processed melt with other fertilizer materials may be made.

The process of the present invention is illustrated by the accompanying examples.

EXAMPLE 1

Using the apparatus illustrated in FIGURE 1 the phosphoric acid containing mix is fed from tank 1 through a preheater 2, which in this case was electrical, to tubular reactor 3. Ammonia at 40 p.s.i.g. is also fed to the reactor 3 through line 5. A stirred tank reactor or packed column reactor can be used instead of the tubular reactor 3.

The ammoniated product from reactor 3 having a pH not above 2.7 is led to the head of packed column reactor 6 while a mixture of ammonia and air is fed to the base of reactor 6 through lines 7 and 8 respectively. In this reactor further ammoniation takes place and the resulting product is recovered through line 9.

The air fed into the base of reactor 6 serves to strip the moisture from the material in the reactor and this, together with unreacted ammonia and ammonium nitrate vapor is condensed in condenser 10. Ammonia solution from condenser 10 is recovered at 11. Any unabsorbed ammonia is recovered in scrubbing column 12.

In a typical run using the above apparatus a mixture containing 73.7 parts W./W. of 90% ammonium nitrate solution, 28.6 parts W./W. of 50% $P_2O_5$ wet-process phosphoric acid, and 5.1 W./W. of 98% sulphuric acid was maintained at 100° C. in tank 1 and, on passing through preheater 2, was further heated to 140–155° C. This mixture was then passed at the rate of 40 pounds per hour cocurrently with ammonia at 2.1 pounds per hour through tubular reactor 3 which had a nominal bore of one quarter of an inch and a length of 10 feet. The temperature in reactor 3 reached 180° C. The product from reactor 3 having a pH of 2.5 was fed to the head of reactor 6 where it was reacted countercurrently with a mixture of ammonia and air. Reactor 6 consisted of a vertical column one foot six inches in height and two inches in diameter packed with three-eighth inch rings. Ammoniated material was fed to reactor 6 at 38 pounds per hour, air was fed at 180° C. and ammonia at 20° C. at 0.4 pound/hour. The ammoniated material entering the reactor 6 had a temperature of 177° C. and a pH of 2.5. The product recovered from reactor 6 with a ratio $N:P_2O_5=2:1.0$ had a temperature of 170° C., a pH of 4.0 and a water content of 0.3%. The ammonia conversion was 99%.

EXAMPLE 2

Using the apparatus illustrated in FIGURE 2 a phosphoric acid containing mix is fed from tank 21 through an acid meter 35 and a preheater 22, which in this case was electrical, to tubular reactor 23 along with ammonia from a source unshown through meter 28 and line 29. A stirred tank reactor or a packed column reactor can be used instead of tubular reactor 23.

The product from reactor 23 having a pH of 2.0 to 3.0 is led through a cyclone 24 into a packed column reactor 25 while ammonia and air are fed into the base of reactor 25. Ammoniation takes place in reactor 25, and a melt at a pH of 3.5 to 5.6 flows into tank 26. Steam is evolved during ammoniation and is condensed in a condenser 27. The air escapes through the vent 30; the condensate is discarded to the drains through line 31. It is found that this condensate contains negligible amounts of ammonia and nitrate.

The operation is started as follows: the flow of phosphoric acid containing mix is started. Ammonia is fed into reactor 23 to bring the pH to about 2.5 on leaving reactor 23. The flows of air through meter 32 and ammonia through meter 33 to the base of reactor 25 are then started and adjusted to give a pH of the melt 3.5 to 5.6, a moisture content of about 0.1% $H_2O$. Operation under these conditions is continued until melt begins to overflow from the melt offtake 34 from vessel 26.

The ammonia feed to reactor 23 is then stopped and melt from tank 26 is pumped to reactor 23. The flow from reactor 21 and tank 26 is adjusted until the pH of the mixture issuing from reactor 23 is about 2.5. The flows of air and ammonia into reactor 25 are then adjusted to give a product melt of pH about 4.0 and moisture content of about 0.1%. Operation under those conditions may be continued indefinitely, without blockage of any of the equipment used.

In a typical run using the above apparatus a mixture containing 63.2 parts of 100% ammonium nitrate, 36.0 parts of 50% $P_2O_5$ wet-process phosphoric acid, and 2.5 parts of 98% $H_2SO_4$ sulphuric acid was contacted with 5.8 parts of ammonia and 2 parts of air. The acid feed rate was 23.5 lb./hr. and the melt recycle rate 136 lb./hr. 23 lb./hr. of melt were collected, analysing 27.3% N and 18.2 $P_2O_5$ on a dry basis at a pH of 4.0–4.2. Reactor 23, which was 5 feet long and ¼″ nominal bore, was operated at 180–190° C. Reactor 25, which was 2″ diameter and 4′ 6″ long, packed with ⅝″ Raschig rings, was operated at 190–200° C.

The pH values referred to in this specification are measured on a cold saturated solution of the melts at room temperature.

EXAMPLE 3

To a stirred tank reactor containing previously formed partly ammoniated melt at a temperature of 170° C. and containing 5.3% water were fed, per hour, 27.6 parts of 95% ammonium nitrate solution at 165° C., 23.5 parts of phosphoric acid containing 69% $H_3PO_4$ at 100° C., and 2.6 parts of ammonia gas. 50 parts per hour of partly ammoniated melt from the tank reactor were fed to a stripping column countercurrent to 7.9 parts per hour of ammonia gas at 150° C. and 38.3 parts per hour of hot air. The partly ammoniated melt was thereby ammoniated to the required level and the water content reduced. 47.2 parts per hour of product melt at 165° C. and containing 0.4% water were obtained and this was granulated by spraying onto cascading recycle fines in a rotating drum. The $N:P_2O_5$ ratio of the product was 1:1.

EXAMPLE 4

To a stirred tank reactor containing previously formed partly ammoniated melt at a temperature of 170° C. and containing 5.3% water were fed, per hour, 38.8 parts of 95% ammonium nitrate solution at 165° C., 11.3 parts of phosphoric acid containing 69% $H_3PO_4$ at 100° C., and 1.2 parts of ammonia gas. 49.2 parts per hour of partly ammoniated melt from the tank reactor were fed to a stripping column countercurrent to 38.3 parts per hour of hot air and 3.9 parts per hour of ammonia gas. The partly ammoniated melt was thereby ammoniated to the required level and the water content reduced. 47.2 parts per hour of product melt at 165° C. and containing 0.4% water were obtained and this was granulated by spraying down a prilling column. The $N:P_2O_5$ ratio of the product was 2.5:1.

We claim:

1. A process for the manufacture of ammonium salts containing less than 5% by weight of water which comprises, in a first stage, forming a mixture of ammonium salt and acid, said mixture being selected from the group consisting of (a) a mixture of nitric acid and its ammonium salt having a pH in the range 3.5 to 4.5 (b) a mixture of sulphuric acid and nitric acid and their ammonium salts having a pH in the range 2.0 to 3.0, and (c) a mixture containing at least two compounds selected from the group consisting of nitric acid, phosphoric acid, ammonium nitrate and ammonium phosphate, the selection being made so as to provide at least one acid component, at least one compound containing the nitrate radical, at least one compound containing the phosphate radical, and at least one ammonium containing component, said mixture (c) having a pH in the range 2.0 to 3.0, and, in a second stage, treating the product mixture from the first stage at an elevated temperature with a countercurrent stream of ammonia gas whereby its water content is reduced and an ammonium salt containing less than 5% by weight of water is obtained, said salt being selected from the group consisting of ammonium nitrate, ammonium sulphate nitrate, monoammonium phosphate, diammonium phosphate and mixtures of ammonium phosphate and ammonium nitrate.

2. A process for the manufacture of a mixture of ammonium nitrate and ammonium phosphate containing less than 5% by weight of water which comprises in a first stage, forming a mixture containing at least two compounds selected from the group consisting of nitric acid, phosphoric acid, ammonium nitrate and ammonium phosphate, the selection being made so as to provide at least one acid component, at least one nitrate containing component, at least one phosphate containing component, and at least one ammonium containing component, having a pH in the range 2.0 to 2.8 and, in a second stage, treating the product mixture from the first stage at an elevated temperature with a countercurrent stream of ammonia gas whereby its water content is reduced and a mixture of ammonium nitrate and ammonium phosphate is obtained containing less than 5% by weight of water.

3. A process for the manufacture of a mixture of ammonium nitrate and ammonium phosphate containing less than 5% by weight of water which comprises, in a first stage, forming a mixture containing at least two compounds selected from the group consisting of nitric acid, phosphoric acid, ammonium nitrate and ammonium phosphate, the selection being made so as to provide at least one acid component, at least one nitrate containing component at least one phosphate containing component, and at least one ammonium containing component having a pH in the range 2.0 to 2.8 and, in a second stage, treating the product mixture from the first stage at an elevated temperature with a countercurrent stream of ammonia gas and a the same time with a stream of inert gas cocurrent with the stream of ammonia whereby its water content is reduced and a mixture of ammonium nitrate and ammonium phosphate is obtained containing less than 5% by weight of water.

4. A process for the manufacture of a mixture of ammonium nitrate and ammonium phosphate containing less than 5% by weight of water which comprises, in a first stage, treating a mixture containing at least two compounds selected from the group consisting of nitric acid, phosphoric acid, ammonium nitrate and ammonium phosphate, the selection being made so as to provide at least one acid component, at least one nitrate containing component and at least one phosphate containing component with ammonia gas until a pH in the range 2.0 to 2.8 is attained and, in a second stage, treating the product mixture from the first stage at an elevated temperaure with a countercurrent stream of ammonia gas whereby its water content is reduced and a mixture of ammonium nitrate and ammonium phosphate is obtained containing less than 5% by weight of water.

5. A process for the manufacture of a mixture of ammonium nitrate and ammonium phosphate containing less than 5% by weight of water which comprises, in a first stage, treating a mixture containing at least two compounds selected from the group consisting of nitric acid, phosphoric acid, ammonium nitrate and ammonium phosphate, the selection being made so as to provide at least one acid component, at least one nitrate containing component and at least one phosphate containing component with ammonia gas until a pH in the range 2.0 to 2.8 is attained and, in a second stage, treating the product mixture from the first stage at an elevated temperature with a countercurrent stream of ammonia gas and at the same time with a stream of inert gas cocurrent with the stream of ammonia whereby its water content is reduced and a mixture of ammonium nitrate and ammonium phosphate is obtained containing less than 5% by weight of water.

6. A process for the manufacture of a mixture containing ammonium nitrate, ammonium phosphate and 0.1% to 5% by weight of water which comprises, in a first stage, reacting ammonia gas with at least two of the group consisting of nitric acid, phosphoric acid, ammonium nitrate and ammonium phosphate the selection being made so as to provide at least one acid component, at least one nitrate containing component and at least one phosphate containing component and the reaction being performed in the presence of a medium containing ammonium ions, hydrogen ions, nitrate ions, phosphate ions and 2% to 10% by weight of water, said medium being held at its boiling point and having a pH in the range 2.0 to 2.8, removing part of said medium and, in a second stage, reacting said removed part with a countercurrent stream of ammonia at a temperature in the range 140° C. to 190° C. whereby water is removed and a final product is obtained having a pH in the range 3.0 to 6.0.

7. A process as claimed in claim 6 wherein during the reaction of said removed part of the medium with a countercurrent stream of ammonia a stream of inert gas is passed cocurrent with the stream of ammonia.

8. A process for the manufacture of a mixture containing ammonium nitrate, ammonium phosphate and 0.1% to 2% by weight of water which comprises, in a first stage, reacting ammonia gas with at least two of the group consisting of nitric acid containing 40% to 80% by weight $HNO_3$, phosphoric acid containing 30% to 50% by weight of $P_2O_5$, ammonium nitrate solution at an elevated temperature containing 85% to 100% by weight of ammonium nitrate and ammonium phosphate solution containing 40% to 99% ammonium phosphate, the selection being made so as to provide at least one acid component, one nitrate containing component and one phosphate containing component, the reaction being performed in the presence of a medium containing ammonium ions, hydrogen ions, nitrate ions, phosphate ions and 2% to 10% by weight of water, said medium being held at 0 to 5° C. of its boiling point and having a pH in the range 2.0 to 2.8 removing part of said medium, and in a second stage, reacting said removed part at a temperature in the range 140° C. to 190° C. with a countercurrent stream of ammonia gas and at the same time with a stream of air whereby its water content is reduced and a product mixture of ammonium nitrate and ammonium phosphate is obtained having a pH in the range 3.0 to 6.0.

9. A process as claimed in claim 8 wherein the ammonium phosphate in the product mixture has an $NH_3:H_3PO_4$ ratio of 1:1 to 1.7:1.

10. A process for the manufacture of a mixture containing ammonium nitrate, ammonium phosphate and 0.1% to 2% by weight of water which comprises, in a first stage, adding phosphoric acid and a nitrate selected from the group consisting of nitric acid and ammonium nitrate to a mixture containing ammonium nitrate and ammonium phosphate to form a mixture of ammonium salts and acids at a pH of 2.0 to 2.8 and, in a second stage, treating the product mixture from the first stage with a countercurrent stream of ammonia gas and at the same time with a stream of air cocurrent with the stream of ammonia whereby its water content is reduced and a product mixture of ammonium nitrate and ammonium phosphate is obtained having a pH in the range 3.0 to 6.0.

References Cited by the Examiner

UNITED STATES PATENTS

| 1,968,323 | 7/1934  | Sperr  | 71—43 |
| 1,999,026 | 4/1935  | Tramm  | 71—35 |
| 2,025,915 | 12/1935 | Tramm  | 71—35 |
| 2,902,342 | 9/1959  | Kerley | 71—43 |
| 3,231,364 | 1/1966  | Booth  | 71—39 |

FOREIGN PATENTS 388,417   2/1933   Great Britain.

OTHER REFERENCES

Communication from Tennessee Valley Authority, Aug. 25, 1966.

Siegel, M. R. et al., High Analysis Fertilizers From Phosphoric Acid and Conventional Ammoniating Materials; In: Agricultural and Food Chemistry, Sept.-Oct. 1962, vol. 10, No. 5, pp. 353, 344.

Thompson, H. L., et al., Diammonium Phosphate, In: Industrial and Engineering Chemistry, Oct. 1950, vol. 42, No. 10, pp. 2177–2179, 2182.

DONALL H. SYLVESTER, *Primary Examiner.*

T. D. KILEY, *Assistant Examiner.*